(12) United States Patent
Urushihara et al.

(10) Patent No.: US 7,836,462 B2
(45) Date of Patent: Nov. 16, 2010

(54) OPTICAL DISK DEVICE

(75) Inventors: Kenji Urushihara, Kanagawa (JP);
Tsukasa Nakayama, Kanagawa (JP);
Kazunori Hasegawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 937 days.

(21) Appl. No.: 11/573,750

(22) PCT Filed: Aug. 9, 2005

(86) PCT No.: PCT/JP2005/014587

§ 371 (c)(1),
(2), (4) Date: Feb. 15, 2007

(87) PCT Pub. No.: WO2006/022138

PCT Pub. Date: Mar. 2, 2006

(65) Prior Publication Data

US 2007/0247980 A1    Oct. 25, 2007

(30) Foreign Application Priority Data

Aug. 23, 2004   (JP) .............................. 2004-242031
Aug. 23, 2004   (JP) .............................. 2004-242032

(51) Int. Cl.
| | |
|---|---|
| G11B 17/22 | (2006.01) |
| G11B 17/04 | (2006.01) |
| G11B 17/10 | (2006.01) |
| G11B 33/04 | (2006.01) |

(52) U.S. Cl. ..................... 720/617; 720/651; 369/30.66; 369/30.77; 369/30.92

(58) Field of Classification Search ... 369/30.64–30.66, 369/30.69, 30.7, 30.76, 30.77, 30.81, 30.84, 369/30.85, 30.9, 30.92; 720/617, 619, 621–624, 720/651, 652, 662

See application file for complete search history.

(56) References Cited

U.S. PATENT DOCUMENTS 5,099,466 A * 3/1992 Kimura et al. ........... 369/30.81

(Continued)

FOREIGN PATENT DOCUMENTS

| EP | 1 041 552 A | 10/2000 |
|---|---|---|
| JP | 03-235255 A | 10/1991 |
| JP | 04238150 A * | 8/1992 |
| JP | 06-020375 A | 1/1994 |
| JP | 07037315 A * | 2/1995 |
| JP | 09091822 A * | 4/1997 |

(Continued)

OTHER PUBLICATIONS

International Search Report for Application PCT/JP2005/014587, dated Sep. 13, 2005.
Supplementary European Search Report for Application No. EP 05770430, Feb. 6, 2009, Panasonic Corp.

*Primary Examiner*—William J Klimowicz
(74) *Attorney, Agent, or Firm*—RatnerPrestia

(57) ABSTRACT

An optical disk device is capable of reducing a thickness of a loading portion equipped with plural sheets of trays. Trays installed in a main body are energized to put an optical disk between them in the thickness direction. Therefore, a thickness of plural sheets of trays can be reduced by cutting down a clearance between the tray and the optical disk. Also, plural sheets of trays are energized by spring members to be put elastically between them in the thickness direction. Therefore, an excessive pushing force is not applied to the optical disk loaded on the tray. Also, a hollow portion of the tray is formed such that projection portions protruded in excess of a standard thickness dimension of the optical disk do not interfere with the tray. Therefore, even when the projection portions are protruded from an adapter, such adapter can be loaded on the tray.

11 Claims, 15 Drawing Sheets

U.S. PATENT DOCUMENTS

| | | | |
|---|---|---|---|
| 5,130,959 A * | 7/1992 | Wakatsuki et al. ....... | 369/30.81 |
| 5,138,591 A * | 8/1992 | Ogawa et al. ............ | 369/30.83 |
| 5,177,409 A * | 1/1993 | Nilssen ....................... | 315/293 |
| 5,396,475 A * | 3/1995 | Nakagawa et al. ....... | 369/30.84 |
| 5,847,901 A * | 12/1998 | Hirsch ..................... | 360/99.07 |
| 5,917,787 A * | 6/1999 | Tsuchiya et al. ......... | 369/30.81 |
| 5,982,720 A | 11/1999 | Takemasa et al. | |
| 6,041,032 A * | 3/2000 | Ishida et al. ............. | 369/30.77 |
| 6,337,843 B2 * | 1/2002 | Yoshida et al. ......... | 369/178.01 |
| 6,493,294 B1 * | 12/2002 | Yoshida et al. .......... | 369/30.81 |
| 6,744,704 B1 | 6/2004 | Funaya et al. | |
| 6,959,444 B2 * | 10/2005 | Peng ......................... | 720/615 |
| 7,227,816 B2 * | 6/2007 | Weisser et al. .......... | 369/30.77 |
| 2001/0026526 A1 | 10/2001 | Yoshida et al. | |
| 2003/0198147 A1 | 10/2003 | Watanabe et al. | |
| 2004/0057349 A1 | 3/2004 | Nishida et al. | |
| 2004/0111731 A1 * | 6/2004 | Suzuki et al. ............... | 720/624 |

FOREIGN PATENT DOCUMENTS

| | | |
|---|---|---|
| JP | 10-064160 A | 3/1998 |
| JP | 10-275399 A | 10/1998 |
| JP | 11-306636 A | 11/1999 |
| JP | 2000-195134 A | 7/2000 |
| JP | 2001-167499 A | 6/2001 |
| JP | 2003-338112 A | 11/2003 |
| JP | 2003-346412 A | 12/2003 |
| JP | 2004220685 A * | 8/2004 |

* cited by examiner

OPTICAL DISK DEVICE

THIS APPLICATION IS A U.S. NATIONAL PHASE APPLICATION OF PCT INTERNATIONAL APPLICATION PCT/JP2005/014587.

TECHNICAL FIELD

The present invention relates to a multiple-disk changer type optical disk device having a plurality of trays onto which a plurality of optical disks are loaded.

BACKGROUND ART

In the prior art, the multiple-disk changer type optical disk devices in which plural sheets of optical disks are loaded in advance in a main body of the optical disk device and then a desired optical disk is selected and recorded/played have been developed (see Patent Literature 1 and Patent Literature 2, for example).

In the optical disk device disclosed in Patent Literature 1, plural sheets of trays are stacked/arranged in the housing portion in the case to go up and down, and the optical disks can be loaded in the case as many as the sheets of optical disks. Then, a work space for a desired optical disk is provided by moving vertically the tray that houses the desired optical disk therein, etc., and a recording or playing operation is applied to the desired optical disk.

As shown in FIG. 15, in an optical disk device 100 disclosed in Patent Literature 2, a slot 103 is provided on the front side of a main body 101. A large-diameter disk 102 with an outer diameter of 12 cm such as CD (Compact Disc), DVD (Digital Versatile Disc), or the like and media such as a dummy disk assembled by fitting a small-diameter CD with an outer diameter of 8 cm in an annular adapter with an outer diameter of 12 cm, and the like is inserted through the slot 103. A carrying roller 104 is provided rotatably on the inside of the slot 103 in the slot 103 to intersect orthogonally with the carrying direction. This carrying roller 104 carries the large-diameter disk 102, which is inserted through the slot 103 and decided as the normal disk by outer-diameter sensors 105, 106, or the like into the inside of the main body.

A plurality of trays 107 are stacked vertically in the rear of the carrying roller 104 (the right side in FIG. 15). A rotating arm 110 having a turntable 108 at its top end is provided in rear of the tray 107 to swing on a rotating shaft 109. This turntable 108 turns while grasping the disk 102. A pickup (not shown) is provided to the rotating arm 110 to move reciprocally. After the rotating arm 110 is swung and positioned in a recording/playing position, the recording/playing operation is applied to the disk 102 while moving the pickup reciprocally.

Patent Literature 1: JP-A-2001-167499 (FIG. 1)
Patent Literature 2: JP-A-2003-338112 (FIG. 4)

DISCLOSURE OF THE INVENTION

Problems that the Invention is to Solve

By the way, in Patent Literature 1, since a whole outer circumference of the tray is not continuously formed, the inserted optical disk cannot be held uniformly in the circumferential direction of the optical disk. Also, since the tray lacks strength, a warp of the optical disk loaded in the tray cannot be eliminated. Therefore, such a problem existed that the optical disk device becomes thick to the extent that a warp of the optical disk should be considered.

Also, in Patent Literature 2, a plurality of holding portions that can hold the 8 cm CD on the inner peripheral portion of the circular-disk main body are provided to the 8 cm CD adapter that is used to handle the 8 cm CD in the same way as the 12 cm CD. Respective holding portions clamp predetermined locations of the periphery of the 8 cm CD in the thickness direction, and push elastically the periphery of the 8 cm CD toward the center to hold the 8 cm CD. Therefore, in the structure that the disk holding claws of the 8 cm CD adapter come into contact with the tray, a thickness obtained when a plurality of trays are stacked is increased because of the thickness of the disk holding claws of the 8 cm CD adapter. As a result, such a problem existed that it is difficult to realize a reduction in thickness of the optical disk device.

The present invention has been made to solve the problems in the prior art, and it is a first object of the present invention to provide an optical disk device capable of reducing a thickness of this optical disk device not to be affected by a warp of the loaded optical disk.

Also, the present invention has been made to solve the problems in the prior art, and it is a second object of the present invention to provide an optical disk device capable of achieving a reduction in thickness of this optical disk device even when a small-diameter optical disk fitted into an adapter is loaded.

Means for Solving the Problems

In order to achieve the first object, an optical disk device of the present invention, includes a main body for loading a plurality of optical disks in an inside; and a plurality of trays for holding each of the optical disks individually in an inside of the main body; wherein an outer peripheral portion of each of the trays comes into contact with an outer peripheral portion of each optical disk held in each tray over a substantially whole circumference.

According to this configuration, the outer circumferential portion of each tray of a plurality of trays comes into contact with the optical disk substantially over the whole circumference to hold such disk. Therefore, a pushing force can be applied uniformly in the circumferential direction of the optical disk, and a thickness of the optical disk device can be reduced not to be affected by the warp of the loaded optical disk.

Also, in the optical disk device of the present invention, each of the trays has a hollow portion formed substantially concentrically with each of the optical disks held in the tray.

According to this configuration, a pushing force can be applied uniformly in the circumferential direction of the optical disk, a thickness of the optical disk device can be reduced irrespective of the influence of the warp of the loaded optical disk, and a reduction in weight of the optical disk device can be achieved.

Also, in the optical disk device of the present invention, each of the trays has an energizing unit for energizing the tray to push the optical disk in a thickness direction.

According to this configuration, a pushing force enough to correct a large warp of the optical disk can be applied to the tray. Therefore, the influence of the warp of the optical disk can be eliminated more surely.

Also, in the optical disk device of the present invention, the energizing unit has an energizing force for absorbing a vibration applied from an outside.

According to this configuration, a reduction in thickness of the optical disk device can be realized, and also the optical disk device capable of keeping a stable operation not to add vibration isolating parts separately even when a vibration is applied from the outside can be provided.

Also, in the optical disk device of the present invention, the energizing unit has an energizing force that is larger than a sum of an energizing force for bringing a contact face of the loaded optical disk into contact with the tray and an energizing force for absorbing a vibration applied from an outside.

According to this configuration, a reduction in thickness of the optical disk device that is not affected by the warp of the inserted optical disk can be realized, and also the optical disk device capable of maintaining a stable operation even when a vibration is applied from the outside can be provided.

Also, in the optical disk device of the present invention, the energizing unit is provided in plural locations to the tray.

According to this configuration, an energizing force can be applied uniformly to the tray.

Also, in the optical disk device of the present invention, the energizing unit is formed of a spring member whose one end is fixed to the tray and whose other end is fixed to the main body.

According to this configuration, the energizing unit can be formed with a simple structure made of the spring member.

In contrast, in order to achieve the second object, an optical disk device of the present invention, includes a main body for loading a plurality of optical disks in an inside; and a plurality of trays for holding each of the optical disks individually in an inside of the main body; wherein each of the trays has a hollow portion formed substantially concentrically with each of the optical disks held in the tray, and the hollow portion is formed such that projection portions formed in excess of a standard thickness dimension of the optical disk do not interfere with the tray.

According to this configuration, the hollow portion corresponding to the holding hole of the optical disk is provided to a plurality of trays that are provided in the main body in a stacked manner to load the optical disk thereon, respectively. This hollow portion is formed in such a way that the projection portions protruded in excess of the standard thickness dimension of the optical disk do not interfere with the tray. Therefore, even when the small-diameter optical disk fitted in the adapter whose projection portions are protruded is loaded, for example, a reduction in thickness of the optical disk device can be still realized.

Also, in the optical disk device of the present invention, each of the trays has an energizing unit for energizing the tray to push the optical disk in a thickness direction.

According to this configuration, a clearance between the optical disk and the tray can be forcedly eliminated. Therefore, a reduction in thickness of the optical disk device can be further realized.

Also, in the optical disk device of the present invention, the energizing unit has an energizing force for bringing a contact face of the loaded optical disk into contact with the tray.

According to this configuration, even though the loaded optical disk is warped, the tray can hold the optical disk in a state that such warp is corrected by the energizing unit. Therefore, a incremented thickness due to the warp of the optical disk can be removed, and a reduction in thickness of the optical disk device that is not affected by the warp of the inserted optical disk can be realized.

Also, in the optical disk device of the present invention, the energizing unit has an energizing force for absorbing a vibration applied from an outside.

According to this configuration, a reduction in thickness of the optical disk device can be realized, and also the optical disk device capable of keeping a stable operation not to add vibration isolating parts separately even when such drive receives a vibration from the outside can be provided.

Also, in the optical disk device of the present invention, the energizing unit has an energizing force that is larger than a sum of an energizing force for bringing a contact face of the loaded optical disk into contact with the tray and an energizing force for absorbing a vibration applied from an outside.

According to this configuration, a reduction in thickness of the optical disk device that is not affected by the warp of the inserted optical disk can be realized, and also the optical disk device capable of keeping a stable operation even when such drive receives a vibration from the outside can be provided.

Also, in the optical disk device of the present invention, the energizing unit is formed of a spring member whose one end is fixed to the tray and whose other end is fixed to the main body.

According to this configuration, the energizing unit can be formed with a simple structure made of the spring member, and also the highly-reliable and thin optical disk device capable of keeping a stable operation even when such drive receives a vibration from the outside can be provided.

ADVANTAGES OF THE INVENTION

According to the present invention, the outer circumferential portion of each tray of a plurality of trays comes into contact with the optical disk substantially over the whole circumference to hold such disk. Therefore, the influence of the warp of the optical disk can be eliminated by applying a pushing force uniformly in the circumferential direction of the optical disk, and a thickness of the optical disk device can be reduced not to be affected by the warp of the loaded optical disk.

Also, according to the present invention, the hollow portions of the tray corresponding to the holding holes of the optical disk are formed such that projection portions projected in excess of a standard thickness dimension of the optical disk do not interfere with the tray. Therefore, the optical disk device having such an advantage that, for example, even when the small-diameter optical disk fitted into the adapter is loaded, a reduction in thickness of the optical disk device can be attained can be provided.

Figure 1:
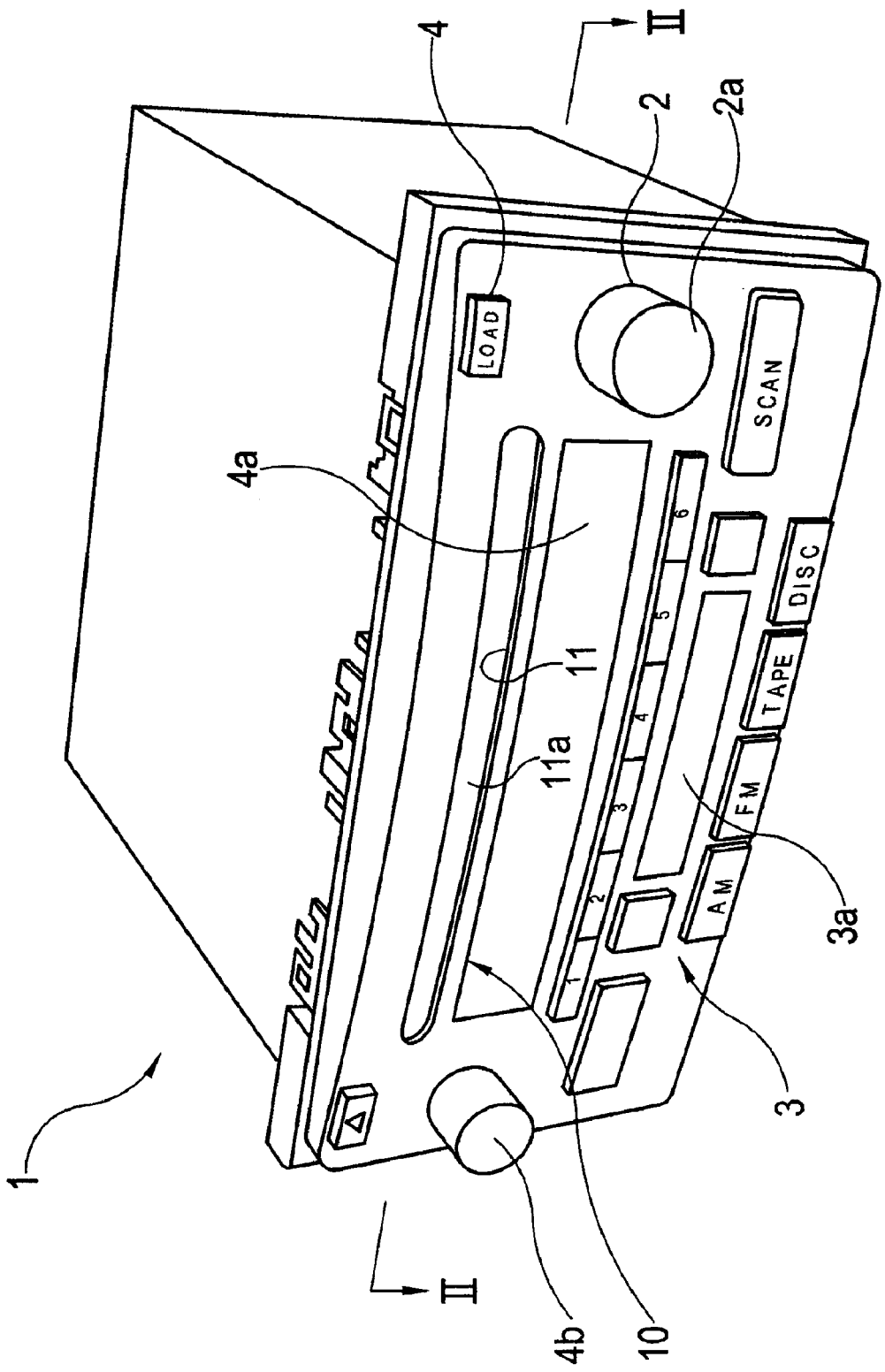
FIG. 1 A general perspective view of a car audio equipment in which an optical disk device according to an embodiment of the present invention is built.

DESCRIPTION OF REFERENCE NUMERALS AND SIGNS 10 optical disk device
12 optical disk
13 main body
14 adapter
14b disk retaining detent (projection portion)
17 spring member (energizing unit)
21 tray
22a hollow portion
T standard thickness dimension

BEST MODE FOR CARRYING OUT THE INVENTION

An optical disk device according to an embodiment of the present invention will be explained with reference to the drawings hereinafter.

A general perspective view of a car audio equipment 1 in which an optical disk device 10 according to an embodiment of the present invention is built is shown in FIG. 1.

A radio 2, a cassette tape player 3, etc. as well as the optical disk device 10 are built in the car audio equipment 1. An optical disk slot 11 for the optical disk device 10, a radio tuning knob 2a, a cassette insertion slot 3a, and the like are provided in addition to a display portion 4a used commonly in all functions and a power/volume knob 4b. Also, a controlling portion 5 for controlling the radio 2, the cassette tape player 3, the optical disk device 10, etc. is provided on the inside.

Figure 2:
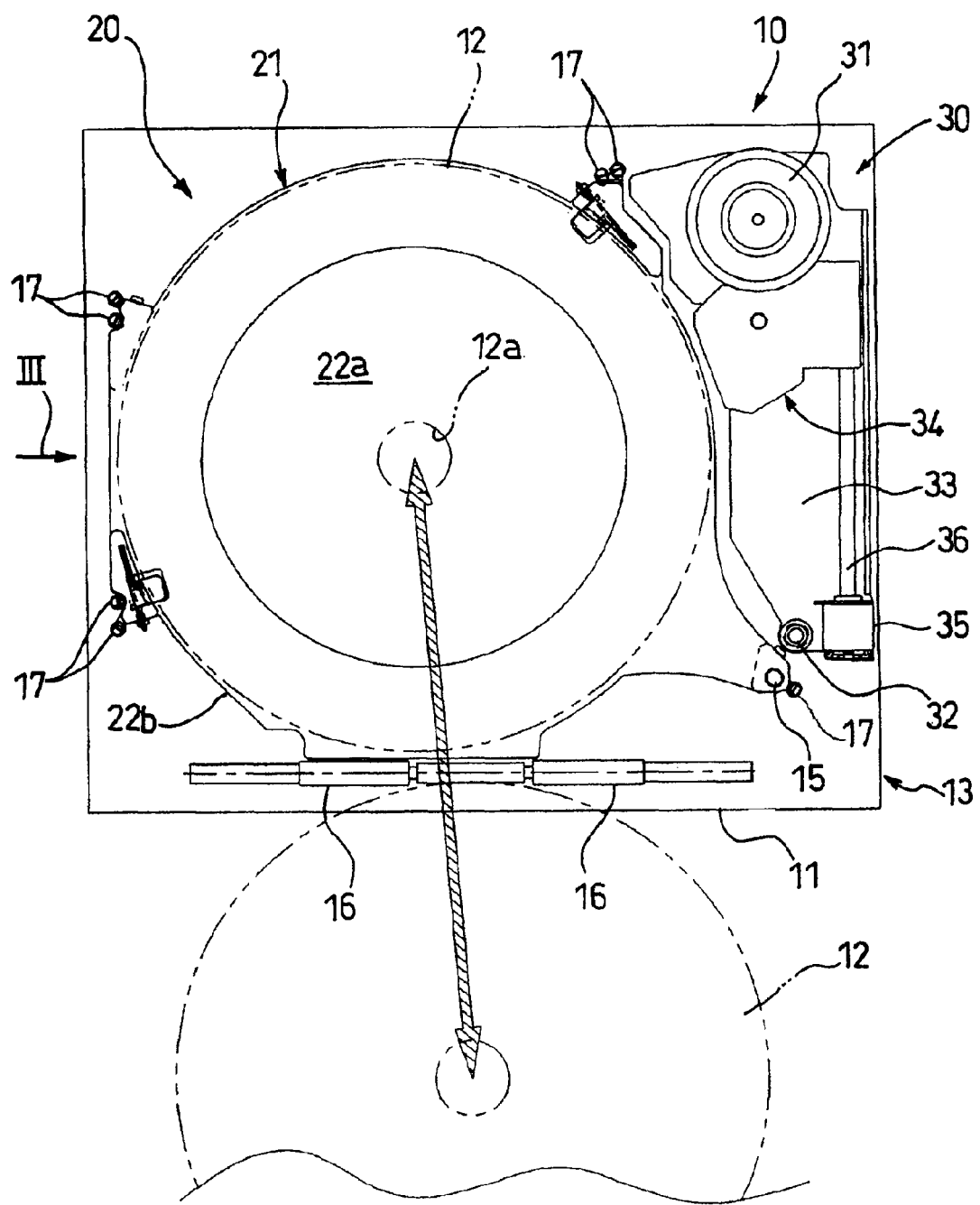
FIG. 2 A plan view of the optical disk device according to the embodiment of the present invention when viewed from a II-II position in FIG. 1.

A plan view of the optical disk device 10 according to the embodiment of the present invention built in the car audio equipment 1 when viewed from a II-II position in FIG. 1 is shown FIG. 2. A side view of the optical disk device when viewed from a III direction in FIG. 2 is shown in FIG. 3.

Figure 3:
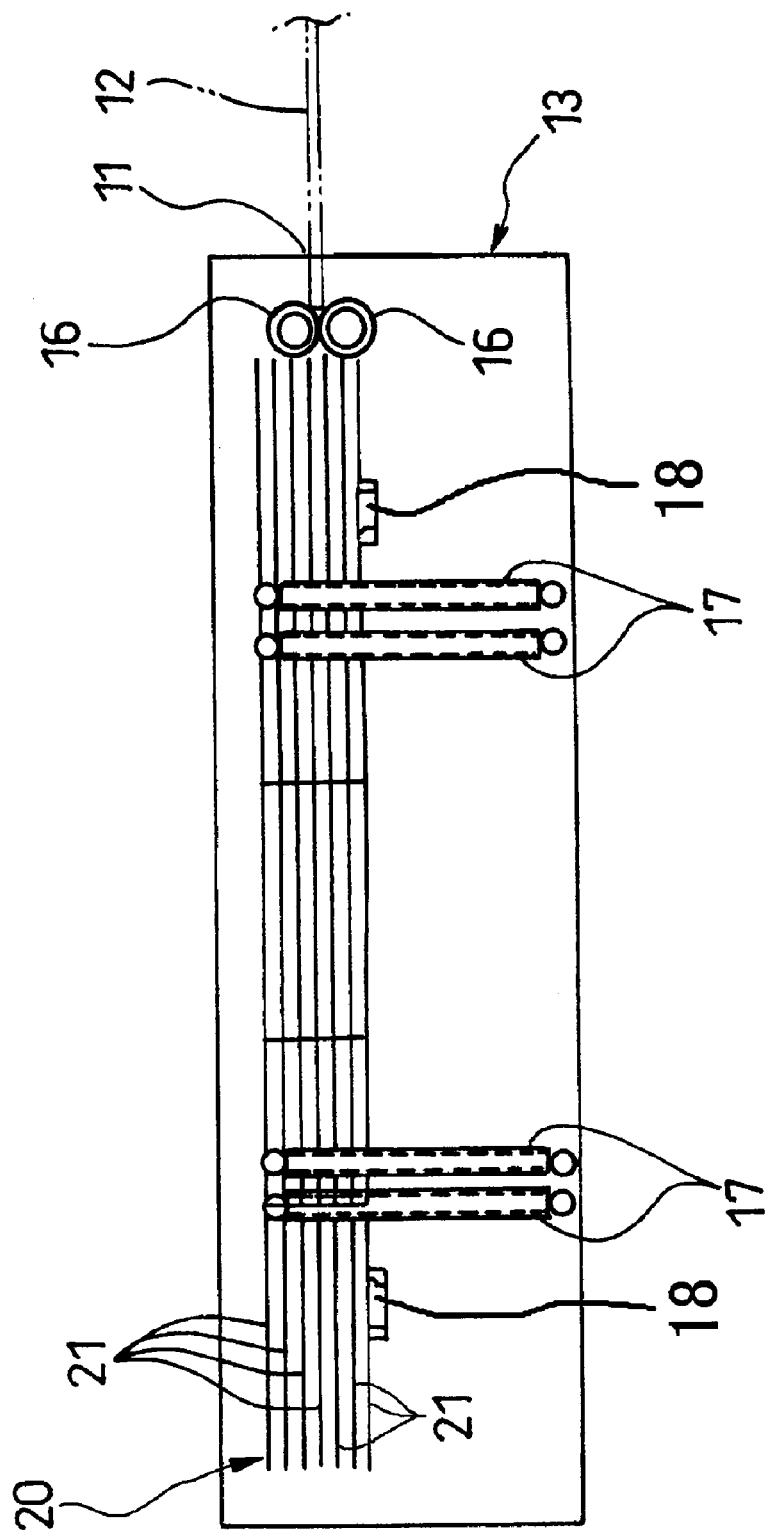
FIG. 3 A side view of the optical disk device when viewed from a III direction in FIG. 2.

As shown in FIG. 2 and FIG. 3, the optical disk device 10 includes a main body 13 capable of housing a plurality of optical disks 12 therein, and a disk loading portion 20 consisting of a plurality of trays 21 that hold the optical disk 12 individually on the inside of the this main body 13. A circular holding portion 22 for holding the optical disk 12 is provided in the tray 21, and a hollow portion 22a corresponding to a holding hole 12a as the center hole of the optical disk 12 is provided in the holding portion 22. This hollow portion 22a is provided such that the projection portion formed in excess of a standard thickness dimension T of the optical disk 12 (e.g. a disk retaining detent 14b as the projection portion described later in FIG. 5) does not interfere with the tray 21. Also, the holding portion 22 has an arm portion 23 projected therefrom like an arm, and a guide hole 24 that is used to move vertically along a guide pin 15 is provided to the top end of the arm portion 23. An engaging portion 25 to which a spring member 17 like a spring as the above energizing unit is fastened is provided to a predetermined position of an outer periphery of the tray 21. Respective stacked trays 21 are energized by this spring member 17 to be pushed mutually.

Here, the optical disk 12 is a general term for the normal large-diameter optical disk with an outer diameter of 12 cm and an in-adapter optical disk constructed by fitting a small-diameter disk 12B with an outer diameter of 8 cm in an adapter 14 that corresponds to the optical disk with the outer diameter of 12 cm.

As shown in FIG. 2, a rotating arm 30 is provided in vicinity (right side in FIG. 2) of the tray 21 in the main body 13 to swing on a pivot 32, and a turntable 31 that turns while holding the optical disk 12 is provided to a top end of the rotating arm 30. A pickup 34 having an optical head (not shown) is provided to a suspension chassis 33 of the rotating arm 30 in such a way that this pickup 34 can move reciprocally along the direction connecting the pivot 32 and the center of the turntable 31. The pickup 34 is moved by a lead screw 36 that is rotated by a drive motor 35.

Here, carrying rollers 16 being paired vertically are provided on the inside of the main body 13 of the slot 11. The carrying rollers 16 carry in the optical disk 12 inserted into the slot 11 and eject the optical disk 12 whose recording/playing operation is completed from the slot 11.

As shown in FIG. 3, plural sheets of trays 21 are stacked at a predetermined interval on the inside of the main body 13. The spring members 17 like the springs as the energizing unit, which energize to push respective trays 21 between them mutually, are provided to plural locations along the outer periphery of the tray 21 of the disk loading portion 20.

Accordingly, even when a variation is applied from the outside, a stable operation can be ensured. Also, since the tray 21 can be brought into tight contact with the optical disk 12, this tray 21 can also forcedly lessen an amount of warp of the optical disk 12 even when an amount of warp of the optical disk 12 is large. Therefore, a reduction in thickness of the optical disk device 10 can be attained.

Respective trays 21 are fitted at an equal interval to the spring members 17 in a state that the spring members 17 are stretched such that each tray 21 is energized to be pushed further even though this tray 21 contacts the neighboring tray 21. Here, when the neighboring trays 21 do not perfectly come into contact with each other, a spacer (not shown) may be fitted to at least one tray. In this case, an interval between the neighboring trays 21 is set smaller than a thickness of the optical disk 12. Accordingly, normally the optical disk 12 when loaded is pushed by two sheets of neighboring optical disk 12 and held between them.

Also, lifting members 18 are provided to contact the bottom surface of the lowermost tray 21 such that they can be moved vertically. Thus, all the trays 21 can be moved up and down by causing the lowermost tray 21 to ascend and descend.

Figure 4:
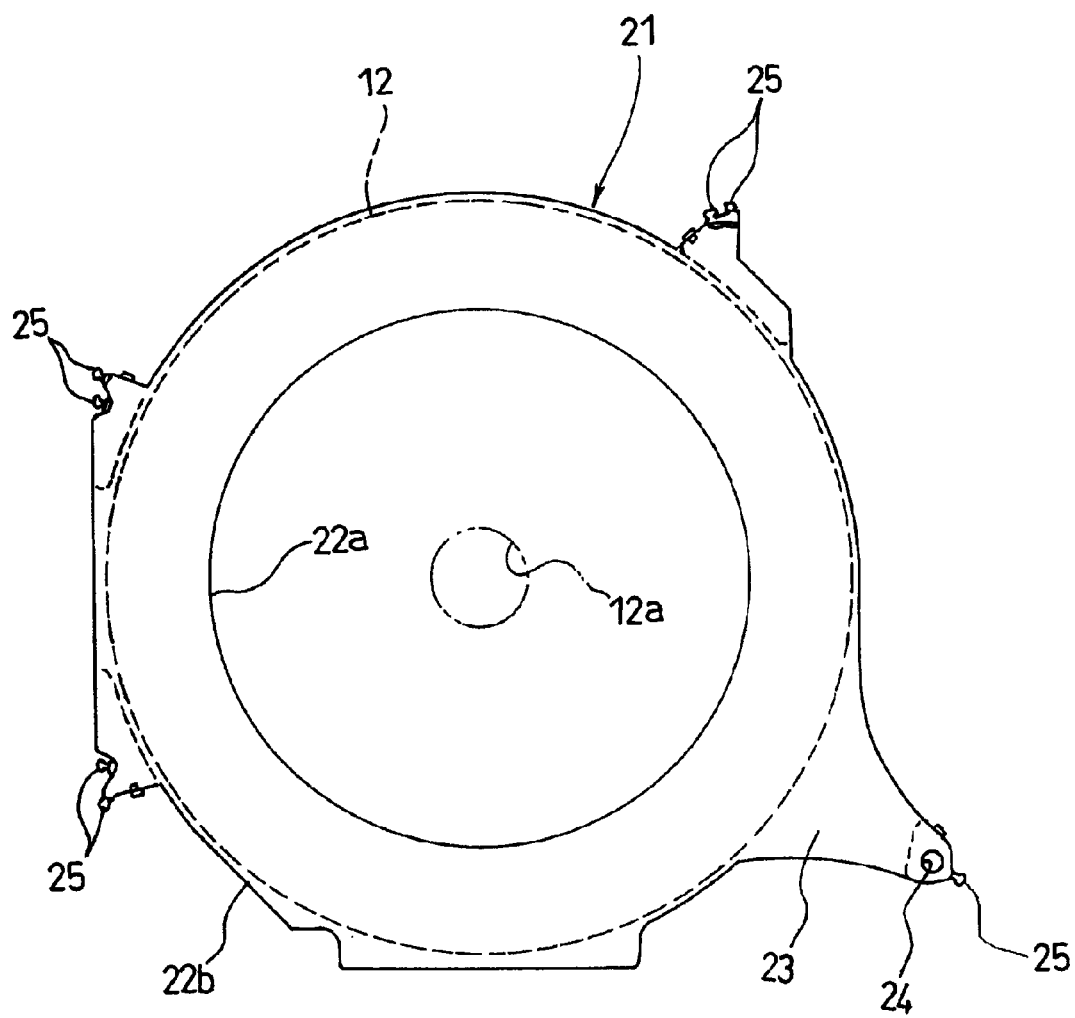
FIG. 4 A plan view of a tray.

The tray 21 is shown in FIG. 4. A circular holding portion 22b that face-contact the label face side of the optical disk 12 to hold the optical disk 12 is provided to a center portion of the tray 21. An outer periphery holding member (not shown) for holding the optical disk 12 from the recording face side of the optical disk 12 is provided near the holding portion 22b. In other words, the tray 21 and the outer periphery holding member put the optical disk 12 between them to store it in the tray 21. Also, the circular hollow portion 22a is cut out from this holding portion 22b. Also, the holding portion 22b has the arm portion 23 projected therefrom like an arm, and the guide hole 24 that is used to move vertically along the guide pin 15 is provided to the top end of the arm portion 23. The engaging portion 25 to which the spring member 17 is fastened is provided to a predetermined position of the outer periphery of the tray 21. Respective stacked trays 21 are energized by this spring members 17 to be pushed mutually.

Figure 5:
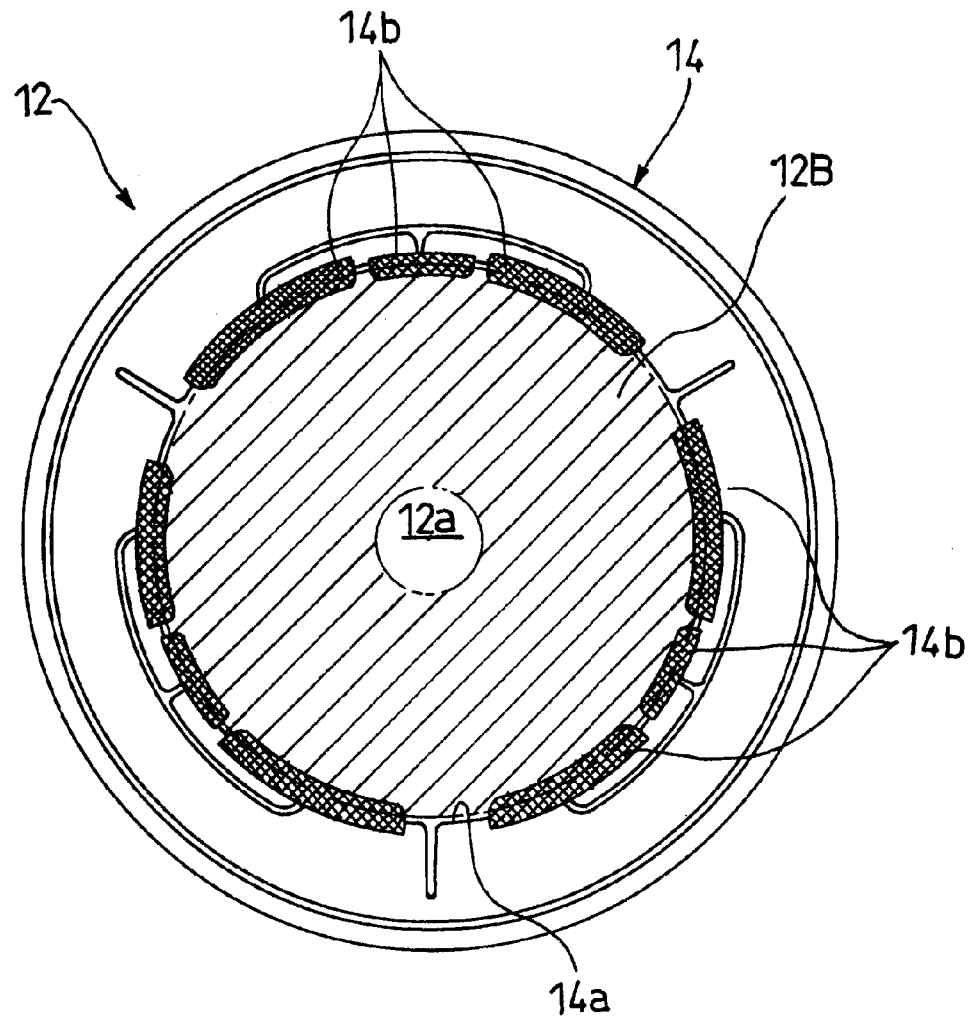
FIG. 5 (A) is a plan view of an adapter for an 8 cm CD, and (B) is a sectional view of the adapter for the 8 cm CD.
Figure 5:
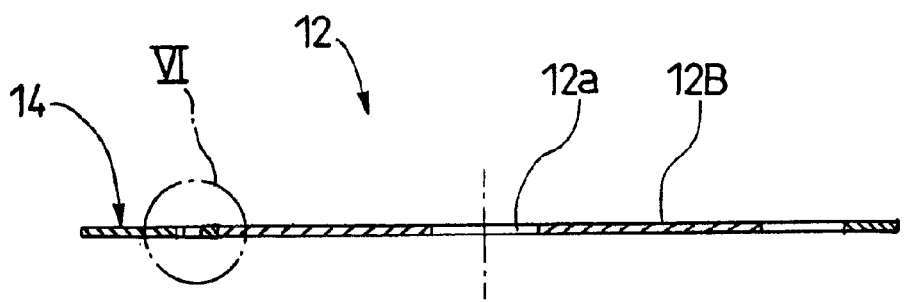
Figure 6:
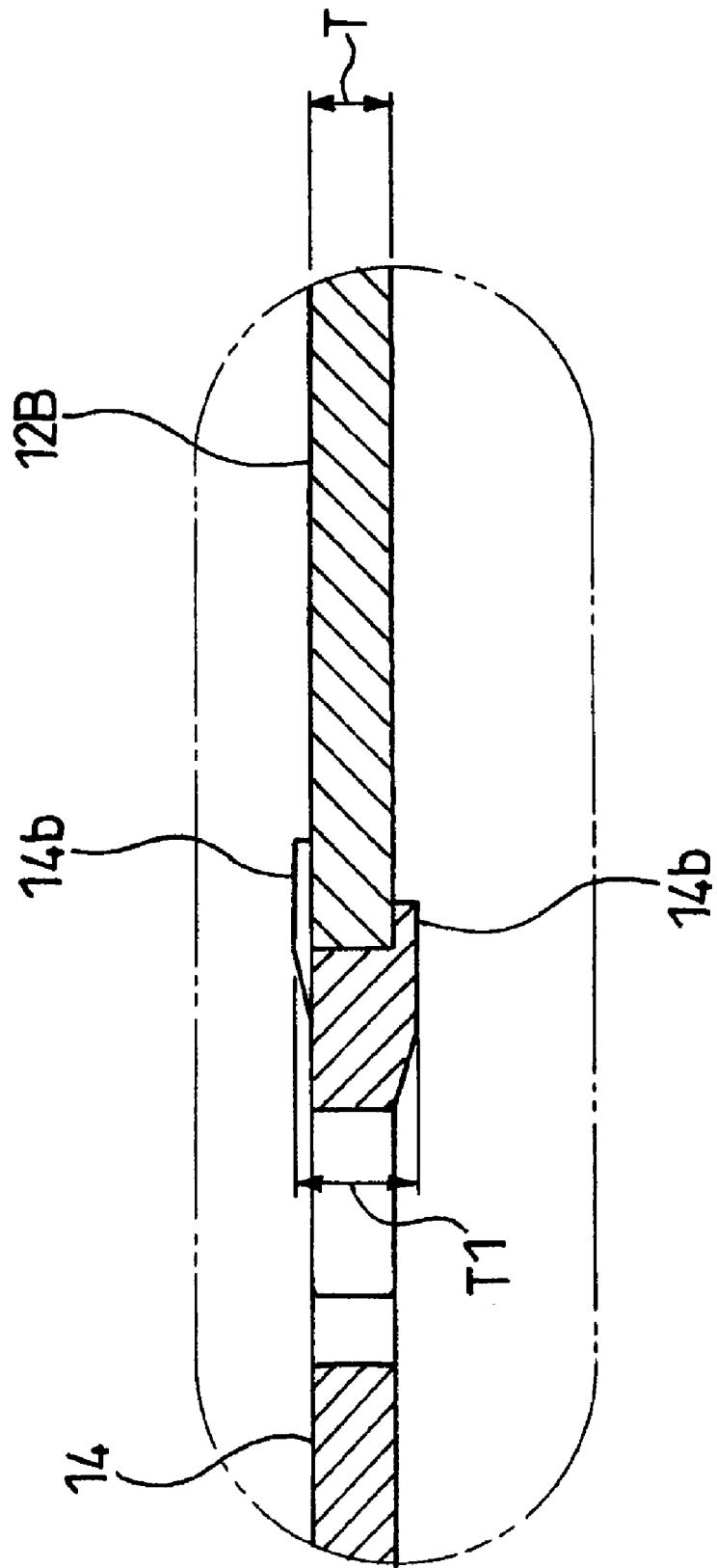
FIG. 6 An enlarged sectional view of a VI portion in FIG. 5(B).

The adapter 14 that makes it possible to handle the 8 cm CD 12B similarly to the 12 cm CD is shown in FIG. 5 and FIG. 6.

The adapter 14 is a circle having an outer diameter that is equal substantially to that of the 12 cm CD. A circular disk insertion hole 14a slightly larger than the outer diameter of the 8 cm CD 12B is provided to a center of the adapter 14 to insert the 8 cm CD 12B. The disk retaining detents 14b as the projection portion used to fit the 8 cm CD 12B into the adapter 14 are provided on an inner peripheral surface of the disk insertion hole 14a from both front and back surfaces alternately.

Accordingly, when the 8 cm CD 12B is fitted into the adapter 14, this 8 cm CD 12B is inserted into the disk insertion hole 14a of the adapter 14 and is fitted between the disk retaining detents 14b on the front and back sides. For this reason, a thickness T1 of the adapter 14 is larger than the standard thickness dimension T in positions of the disk retaining detents 14b to form the above-mentioned projection portion.

Figure 7:
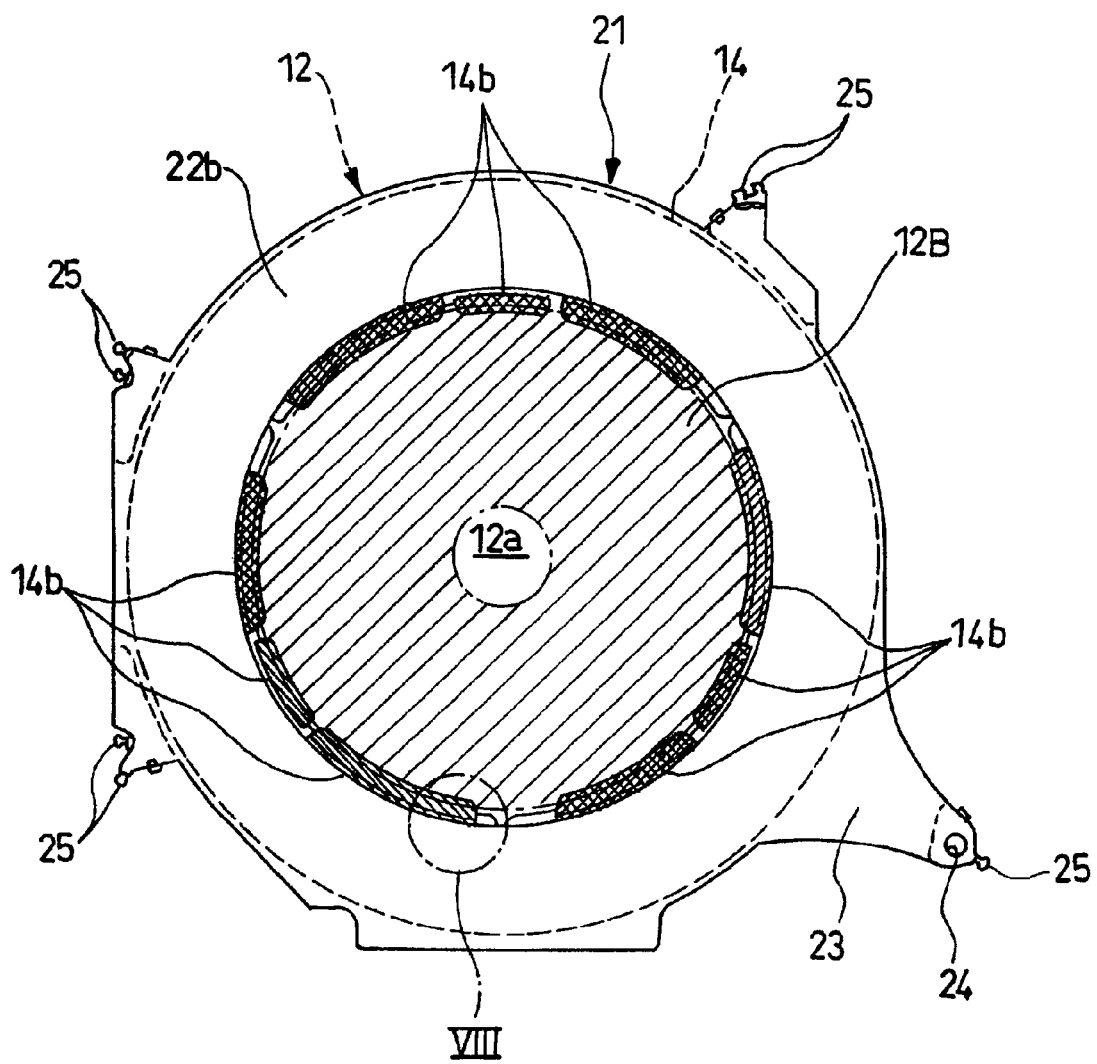
FIG. 7 A plan view of a tray in which an adapter into which an 8 cm CD is fitted is loaded.
Figure 8:
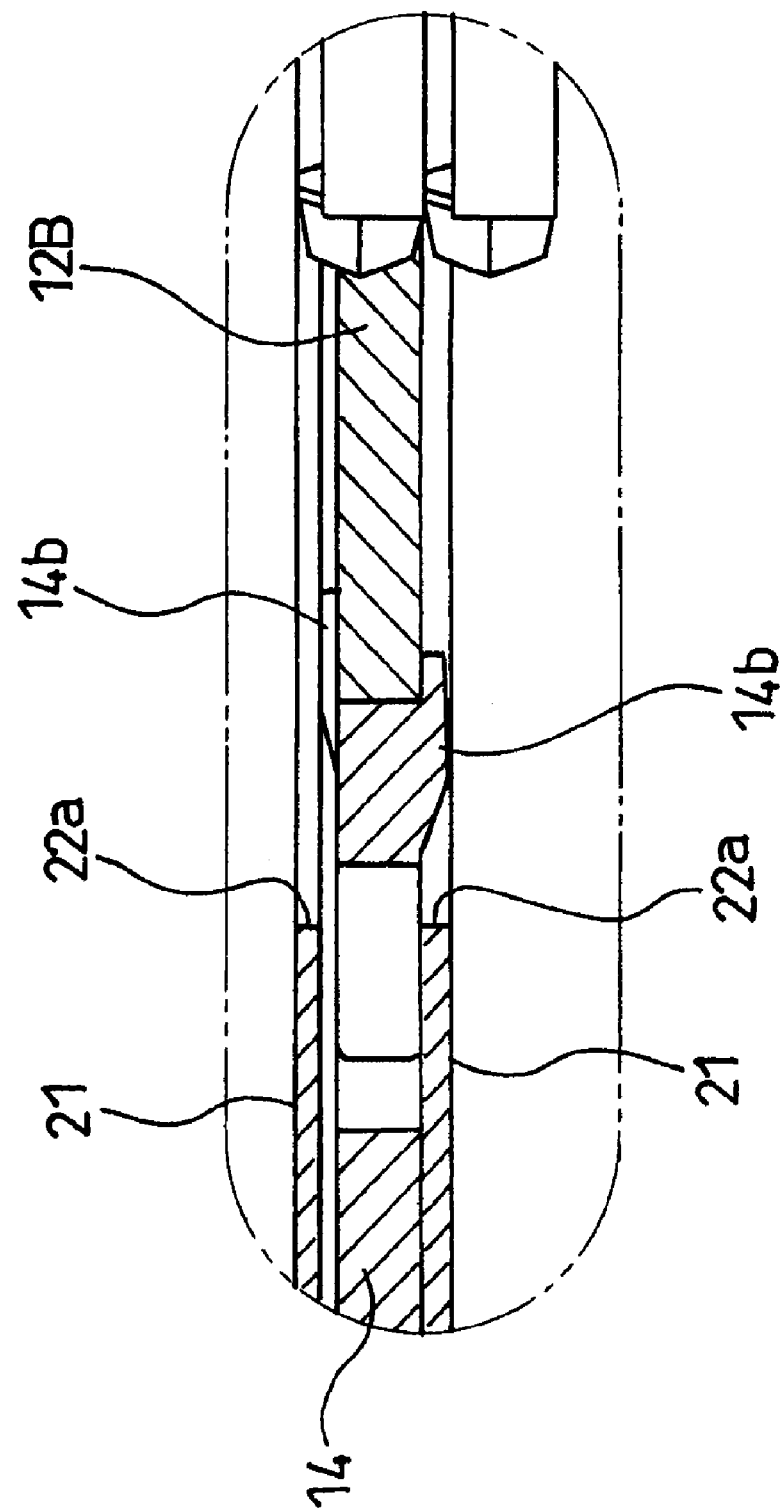
FIG. 8 An enlarged sectional view of a VII portion in FIG. 7.

A state where the 8 cm CD 12B with the adapter 14 is loaded in the holding portion 22b of the tray 21 is shown in FIG. 7. The hollow portion 22a provided in the center portion of the tray 21 is formed to prevent the interference between the disk retaining detents 14b, a thickness of which exceeds the standard thickness dimension T of the optical disk 12, and the tray 21. In other words, an inner diameter of the hollow portion 22a is set to a size that can contain therein the disk retaining detents 14b fitted into the disk insertion hole 14a of the adapter 14. As a result, when the 8 cm CD 12B with the adapter 14 is loaded in the tray 21, all the disk retaining detents 14b of the adapter 14 are housed in the disk insertion hole 14a, as shown in FIG. 8.

Also, a tray lifting member for lifting vertically a tray group is provided to the lowest tray of the tray group that consists of a plurality of trays. This tray lifting member takes an ascending/descending operation along a shaft fixed to the main body 13 (case) in the vertical direction, or the like by using a power source (not shown), and holds a height position of the tray group in a predetermined position.

Next, an operation of the optical disk device 10 according to the present embodiment constructed as above will be explained hereunder.

(1) Loading Operation of the Optical Disk 12

First, the loading operation of the optical disk 12 by the optical disk device will be explained with reference to FIG. 1, FIG. 2, FIG. 3 hereunder. In the optical disk device according to the present embodiment, since the adapter 14 that is holding the 8 cm CD 12B in its center portion is handled in the same manner as the optical disk 12, explanation of the operation of the optical disk device applied to the adapter 14 that is holding the 8 cm CD 12B in its center portion will be omitted herein.

When the loading operation of the optical disk 12 into the optical disk device is carried out, the disk loading portion 20 having a plurality of trays 21 is moved up and down with respect to the main body 13 by operating the power source (not shown). Thus, the disk loading portion 20 is carried up to a predetermined disk carry height.

Then, a tray opening operation is applied to the tray 21, which has been carried to a predetermined disk carrying height, by operating the power source (not shown) to keep an interval from other trays 21, for no obstruction to the loading operation should be caused due to the warp of the loaded optical disk 12 or the disk retaining detents 14b of the adapter 14 that holds the 8 cm CD 12B in its center portion.

Also, in order to permit the loading operation of the optical disk 12, a disk outer periphery holding member (not shown) provided to each tray 21 is operated into its release state.

According to the above operations, the optical disk device 10 is brought into a standby state to wait for the insertion of the optical disk 12.

Then, when the optical disk 12 is inserted into the main body 13 of the optical disk device through the optical disk slot 11 by the user, a sensing unit (not shown) senses that the optical disk 12 is inserted into the inside of the optical disk device. The optical disk device 10 starts an operation of the power source and starts a rotation of the roller members 16, 16.

Then, when the optical disk 12 is inserted further more by the user, the auto loading of the optical disk 12 is started as soon as the optical disk 12 comes into contact with the roller members 16, 16. Thus, the optical disk 12 is carried to a loading completing position.

Then, the power source (not shown) is operated after the optical disk 12 is carried to the loading completing position. Thus, the disk outer periphery holding member (not shown) provided to each tray 21 holds the outer periphery of the optical disk 12 and the tray opening operation for narrowing an interval between the tray 21 and the neighboring tray 21 is executed.

According to this operation, the loading operation of the optical disk 12 onto the tray 21 is completed.

The completion of the loading operation of the optical disk 12 is sensed by a sensing unit (not shown).

When plural sheets of the optical disks 12 are loaded onto respective trays 21, the loading operation for loading plural sheets of optical disks 12 onto respective trays 21 is executed by repeating the above operations.

(2) Ejecting Operation of the Optical Disk 12

Then, the ejecting operation of the optical disk 12 by the optical disk device will be explained with reference to FIG. 1, FIG. 2, FIG. 3 hereunder. In the optical disk device according to the present embodiment, since the adapter 12 that is holding the 8 cm CD 12B in its center portion is handled in the same manner as the optical disk 12, explanation of the operation of the optical disk device applied to the adapter 14 that is holding the 8 cm CD 12B in its center portion will be omitted herein.

When the ejecting operation of the optical disk 12 from the optical disk device is carried out, the disk loading portion 20 is moved up and down with respect to the main body 13 by operating the power source (not shown). Thus, the disk loading portion 20 is carried up to a predetermined disk carry height.

Then, the power source (not shown) is operated. Thus, the disk outer periphery holding members (not shown) provided to the tray 21 to be ejected are retracted to release the held state of the optical disk 12 to be ejected. Also, the tray opening operation is executed to keep an interval between the tray 21 carried up to a predetermined disk carry height and other trays 21 in excess of a predetermined clearance.

Then, the optical disk device 10 starts an operation of the power source to start the rotation of the carrying rollers 16, 16, and also carries the loaded optical disk 12 in the disk ejecting direction by using the power source and the powering unit (not shown). The auto eject of the optical disk 12 is started when the optical disk 12 comes in touch with the carrying rollers 16, 16, and then the optical disk 12 is carried to an ejection completion position. The operation of the power source is stopped as soon as the optical disk 12 is carried to the ejection completion position, and then the rotation of the carrying rollers 16, 16, i.e., the carrying operation of the optical disk 12 is stopped.

Here, the completion of the ejecting operation of the optical disk 12 is sensed by a sensing unit (not shown).

When plural sheets of the optical disks 12 are ejected, the ejecting operation of plural sheets of optical disks 12 is executed by repeating the above operations.

(3) Recording/Playing Operation of the Optical Disk 12

Figure 9:
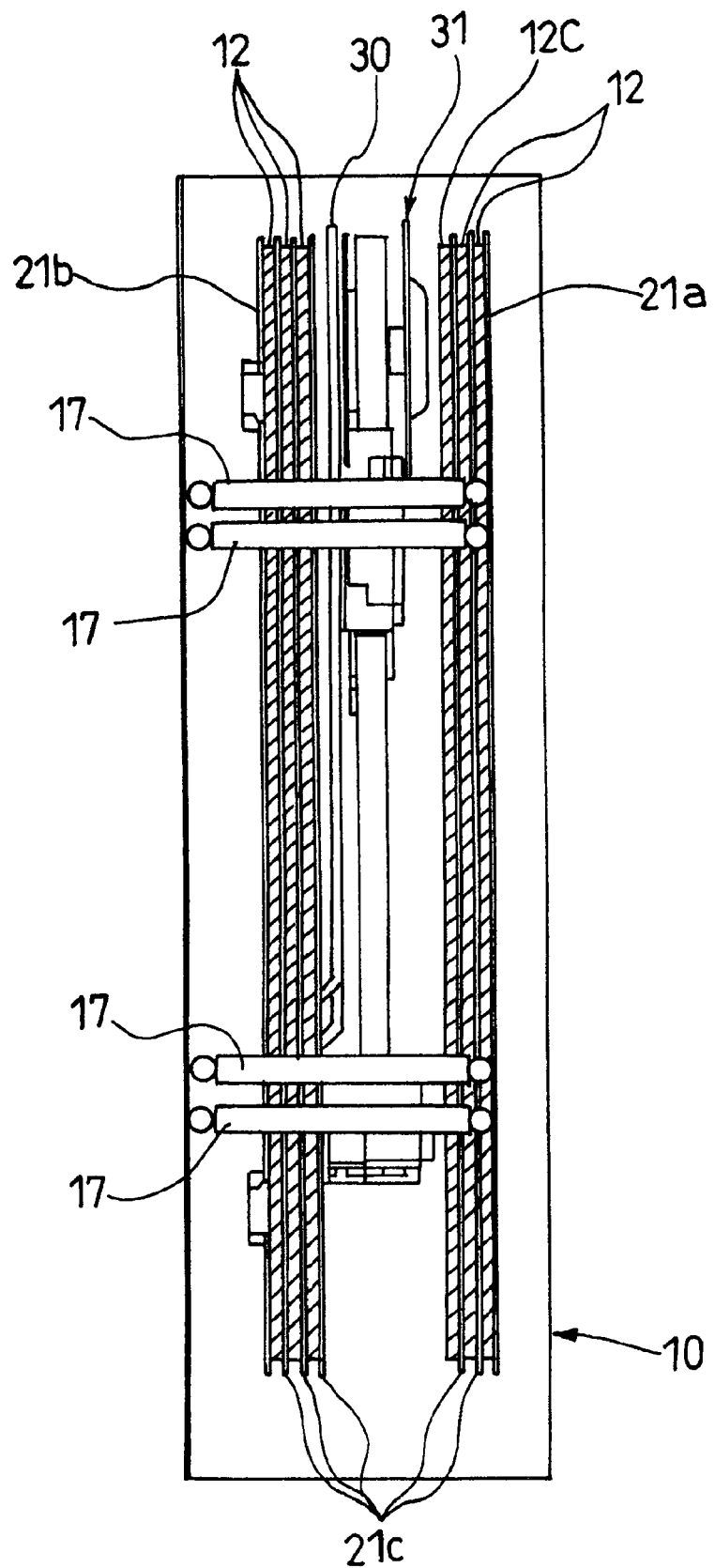
FIG. 9 A side view of a pertinent portion of the optical disk device in a swinging operation mode of a rotating arm as a disk recording/playing portion in the embodiment of the present invention.
Figure 10:
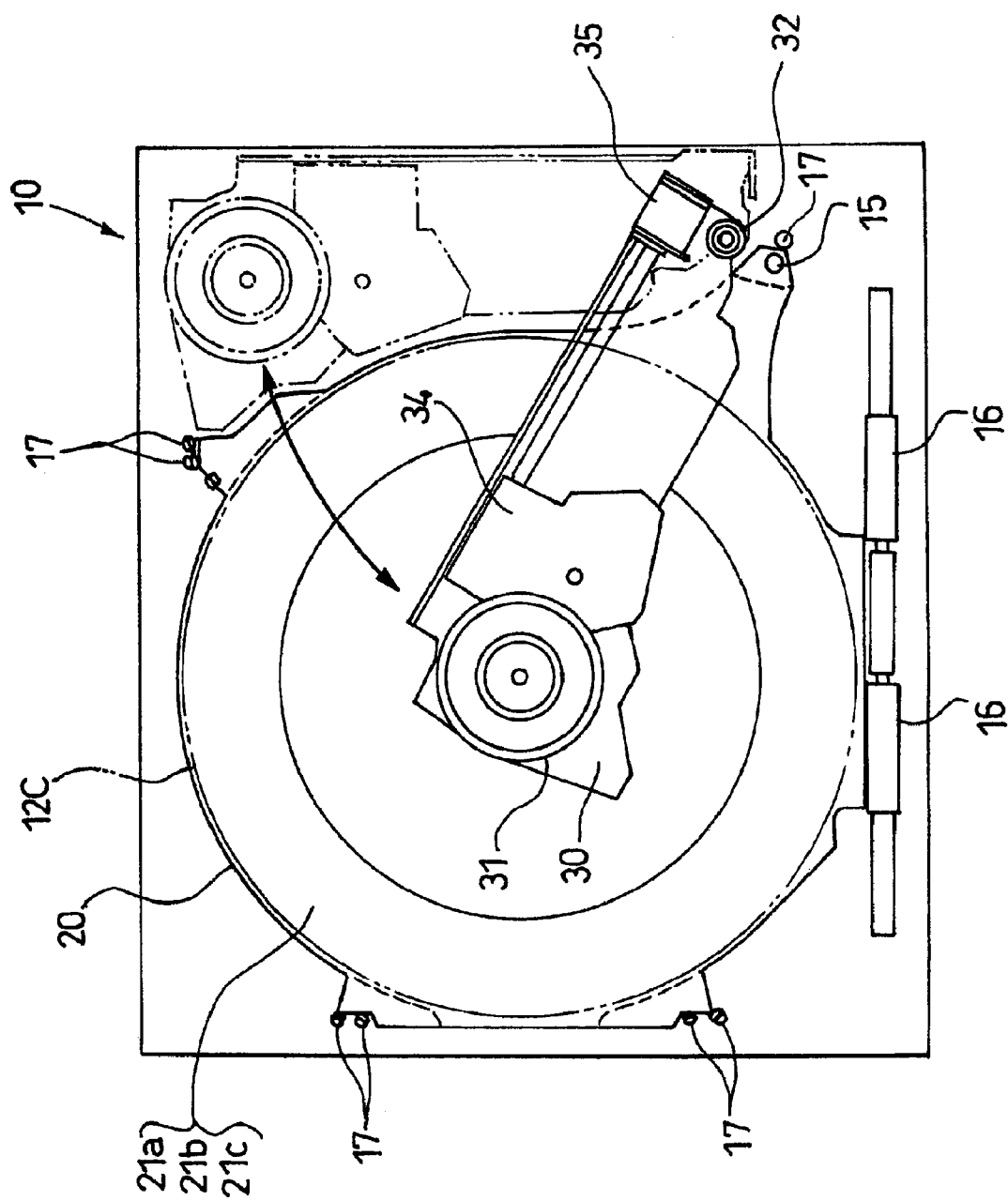
FIG. 10 A top view of a pertinent portion of the optical disk device in a disk recording/playing mode in the embodiment of the present invention.
Figure 11:
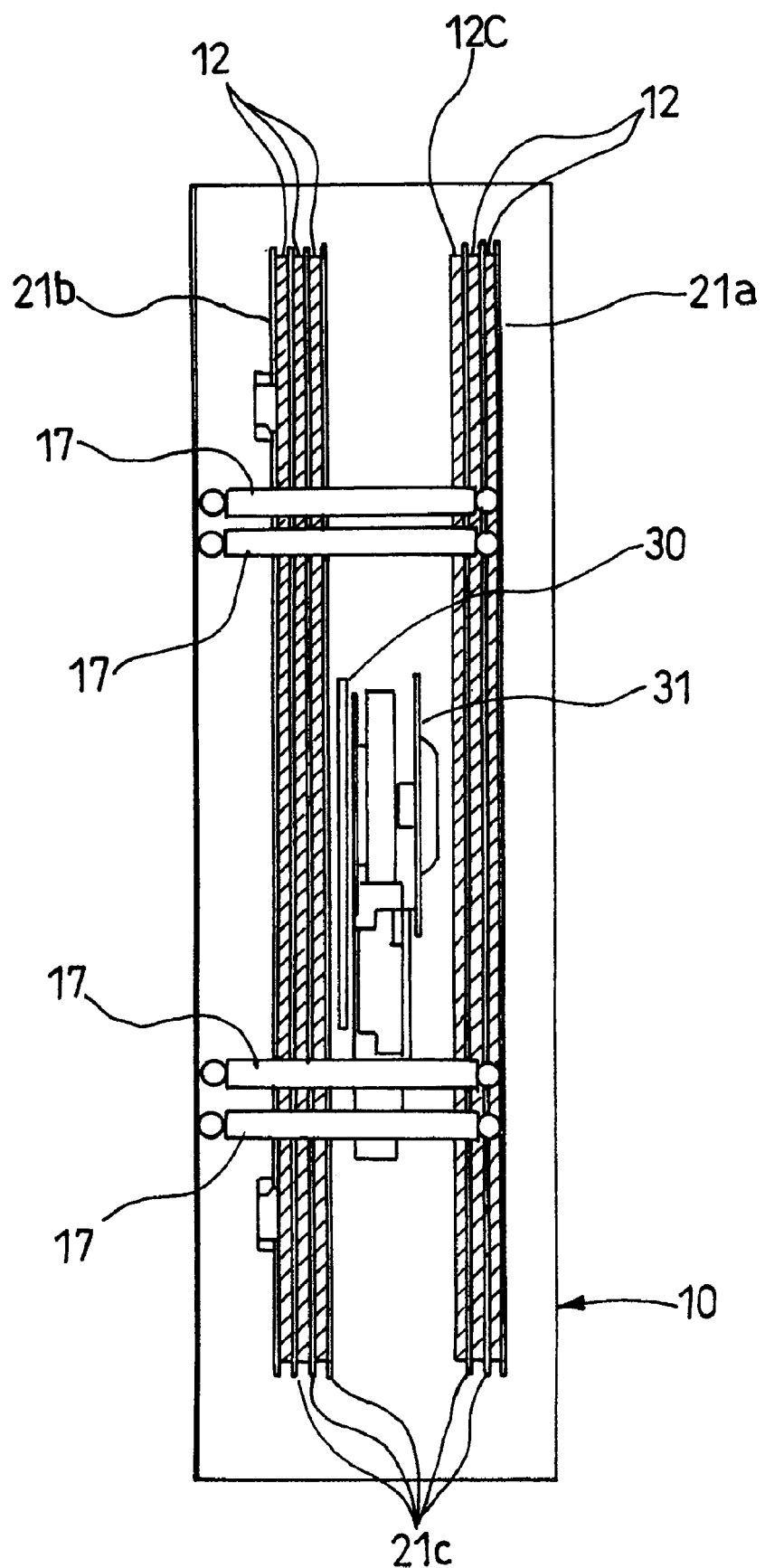
FIG. 11 A side view of a pertinent portion of the optical disk device when a swinging operation of the disk recording/playing portion in the embodiment of the present invention is completed.
Figure 12:
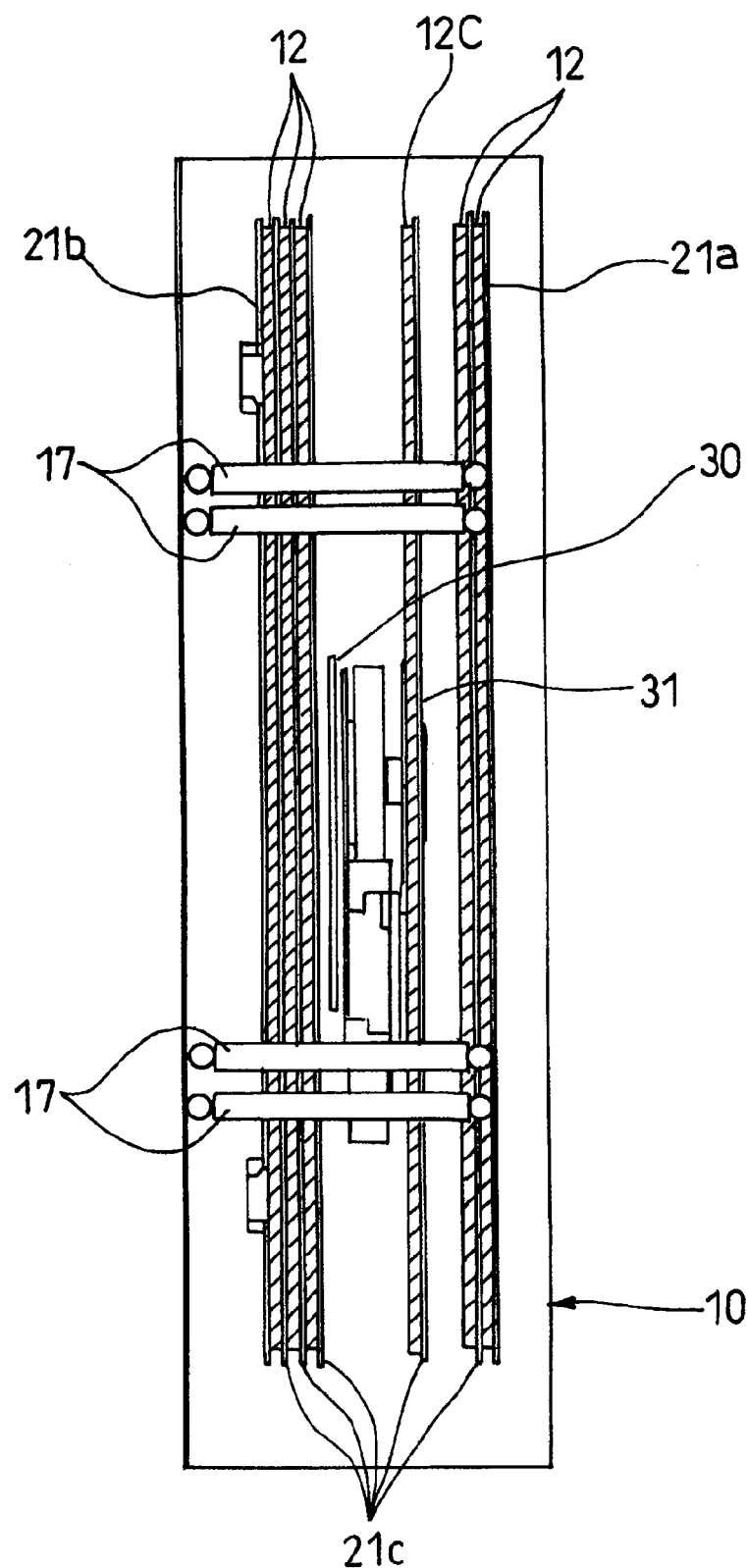
FIG. 12 A side view of a pertinent portion of the optical disk device in a disk clamping mode in the embodiment of the present invention.
Figure 13:
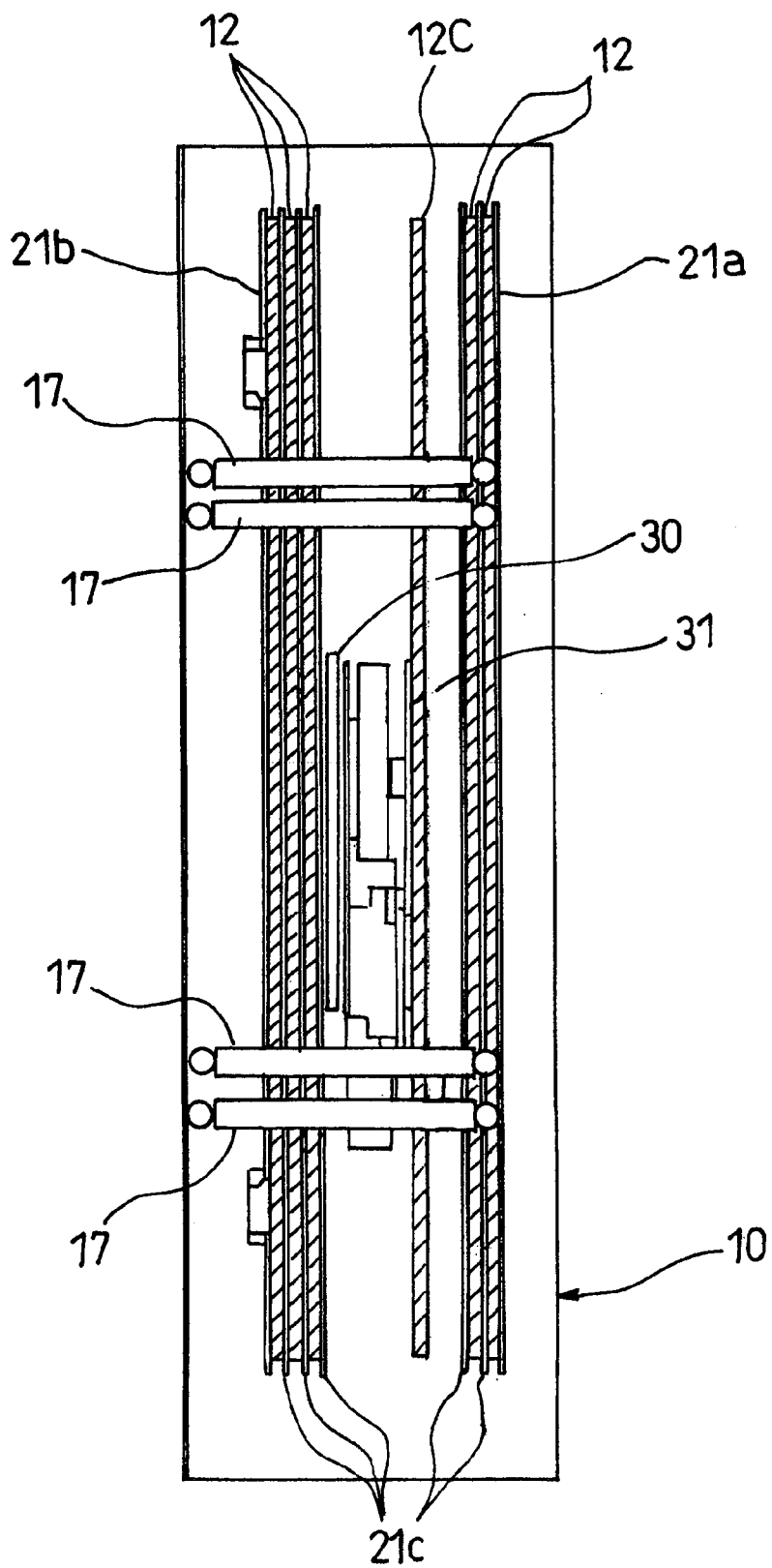
FIG. 13 A side view of a pertinent portion of the optical disk device in a disk recording/playing mode in the embodiment of the present invention.

Then, the recording/playing operation of the optical disk 12 by the optical disk device 10 will be explained with reference to FIG. 1, FIG. 2, FIG. 9, FIG. 10, FIG. 11, FIG. 12, FIG. 13 hereunder. FIG. 9 is a side view of a pertinent portion of the optical disk device in a swinging operation mode of the rotating arm 30 as the disk recording/playing portion in the embodiment of the present invention. FIG. 10 is a top view of a pertinent portion of the optical disk device in a disk recording/playing mode in the embodiment of the present invention. FIG. 11 is a side view of a pertinent portion of the optical disk device when a swinging operation of the disk recording/playing portion in the embodiment of the present invention is completed. FIG. 12 is a side view of a pertinent portion of the optical disk device in a disk clamping mode in the embodiment of the present invention. FIG. 13 is a side view of a pertinent portion of the optical disk device in a disk recording/playing mode in the embodiment of the present invention. In the optical disk device according to the present embodiment, since the adapter 12 that is holding the 8 cm CD 12B in its center portion is handled in the same manner as the optical disk 12, explanation of the operation of the optical disk device applied to the adapter 14 that is holding the 8 cm CD 12B in its center portion will be omitted herein.

First, as shown in FIG. 1 and FIG. 3, the disk loading portion 20 is moved up and down with respect to the main body 13 by operating the power source (not shown). Thus, a predetermined disk (recording/playing disk 12C) is carried up to a predetermined disk carry height.

Then, as shown in FIG. 9, a lower tray 21b, intermediate trays 21c, and the loaded optical disks 12 positioned below the recording/playing disk 12C are carried toward to the lower side of the drive by operating the power source (not shown). Accordingly, the rotating arm 30 is ready to enter into the disk loading portion 20.

In a state in FIG. 9, the recording/playing disk 12C is held by the disk outer periphery holding members (not shown) provided to the intermediate trays 21c and also a displacement of the recording/playing disk 12C in the downward direction of the drive is restricted.

Also, the disk outer periphery holding members (not shown) are similarly provided to an upper tray 21a like the intermediate trays 21c, and the similar operation is executed when the optical disk 12 loaded on the uppermost stage of the disk loading portion 20 is recorded/played.

Then, as shown in FIG. 10 and FIG. 11, the rotating arm 30 is swung on the pivot 32 as a fulcrum with respect to the main body 13 by operating the power source (not shown). According to this operation, the carrying operation of the rotating arm 30 to the disk recording/playing position is completed.

Here, the disk outer periphery holding members provided to the upper tray 21a and the intermediate trays 21c are constructed in positions out of a range of the swinging operation of the rotating arm 30.

Since the upper tray 21a, the intermediate trays 21c, and the disk outer periphery holding members (not shown) are arranged as described above, the optical disk device is constructed such that the upper tray 21a, the intermediate trays 21c, and the lower tray 21b can be connected to the whole circumference of the outer diameter of the optical disk 12 loaded on the disk loading portion 20 while achieving both a reduction in thickness of the disk loading portion 20 and a range of the swinging operation of the rotating arm 30.

Then, as shown in FIG. 12, the power source (not shown) is operated to carry the intermediate tray 21c that is holding the recording/playing disk 12C to the lower side of the drive and then carry the recording/playing disk 12C on the turntable 31. Also, the holding operation of the recording/playing disk 12C on the turntable 31 is completed by the disk clamping unit (not shown).

In a state in FIG. 12, the optical disk 12 loaded on the stage immediately above the recording/playing disk 12C is held by the disk outer periphery holding members (not shown) arranged to the intermediate tray 21c, and a displacement of the optical disk 12 to the downward direction of the drive is restricted.

Then, as shown in FIG. 13, the power source (not shown) is operated. Thus, the disk outer periphery holding members (not shown) provided to the intermediate tray 21c are retracted to release the held state of the recording/playing disk 12C. Also, the intermediate tray 21c that is holding the recording/playing disk 12C is carried to the upper side of the drive to make the recording/playing operation of the recording/playing disk 12C possible. According to this operation, the optical disk device is brought into the recording/playing state.

Here, when the recording/playing disk 12C is loaded on the disk loading portion 20, respective operations are carried out through the opposite procedures to the above recording/playing operation.

The optical disk device 10 according to the present embodiment executes a series of operations as described above. More particularly, a desired optical disk 12 is selected, then a work space is formed by increasing a distance from the tray 21 adjacent to the optical disk 12, and then the distance from the tray 21 can be expanded by letting down the tray 21 on which the optical disk 12 is loaded or letting up the upper tray 21 between which and the loading tray 21 the optical disk 12 is held. At this time, since respective trays 21 are supported elastically by the spring members 17, these trays can be easily moved vertically.

Also, the rotating arm 30 is moved vertically with respect to the work space and is swung, and thus is positioned in the recording/playing position in the work space. Also, the desired optical disk 12 is loaded on the turntable 31. Then, the pickup 34 is moved along a suspension chassis 33 to apply the recording/playing operation to the optical disk 12A.

As described above, according to such optical disk device 10 of the embodiment of the present invention, an interval between respective trays 21 is narrowed. Therefore, a thickness of the disk loading portion 20 equipped with plural sheets of trays 21 in a stacked manner can be reduced and a compactification of the optical disk device 10 can be achieved. Also, when an amount of warp of the optical disk 12 is large, an energizing force of the spring members 17 for pushing the tray 21 is increased larger than a sum of an energizing force for pushing a contact face of the optical disk 12 and an energizing force for absorbing a vibration applied from the outside such that the tray 21 can be brought into tight contact with the optical disk 12. Therefore, an amount of warp of the optical disk 12 can be reduced forcedly small. As a result, a thickness of the disk loading portion 20 can be reduced and also a warp of the optical disk 12 can be corrected. In addition, even when a vibration is applied from the outside, a stable operation can be ensured by using the energizing force of the spring members 17 for pushing the tray 21 as the energizing force for absorbing the vibration applied from the outside of the optical disk device 10.

Also, since a pushing force applied to the tray 21 is an elastic force given by the spring member 17, such a situation can be prevented that an excessive force is applied to damage the optical disk 12 loaded in the tray 21. Also, even when the tray 21 must be opened in loading or playing the optical disk 12, this tray 21 can be easily opened.

Also, according to such optical disk device 10 of the embodiment of the present invention, the hollow portion 22a is provided in a plurality of trays 21, which are provided in the main body 13 in a stacked manner to load the optical disk 12 thereon, to correspond to the holding hole 12a of the optical disk 12, and this hollow portion 22a is formed to have a large diameter such that the disk retaining detents 14b protruded in excess of the standard thickness dimension T of the optical disk 12 do not interfere with the tray 21. Therefore, even when the projection portions are protruded from the adapter upon loading the small-diameter 8 cm CD 12B fitted into the adapter 14 on the tray, such adapter can be loaded on the tray. As a result, a reduction in thickness of the tray 21 can be achieved and a compactification of the optical disk device 10 can be achieved.

In the above embodiment, the case where the hollow portion 22a is provided in the trays 21 is explained. In this case, when the trays having no hollow portion 22a are employed, the optical disk device 10 can be reduced in thickness not to be affected by the warp of the loaded optical disk 12.

Figure 14:
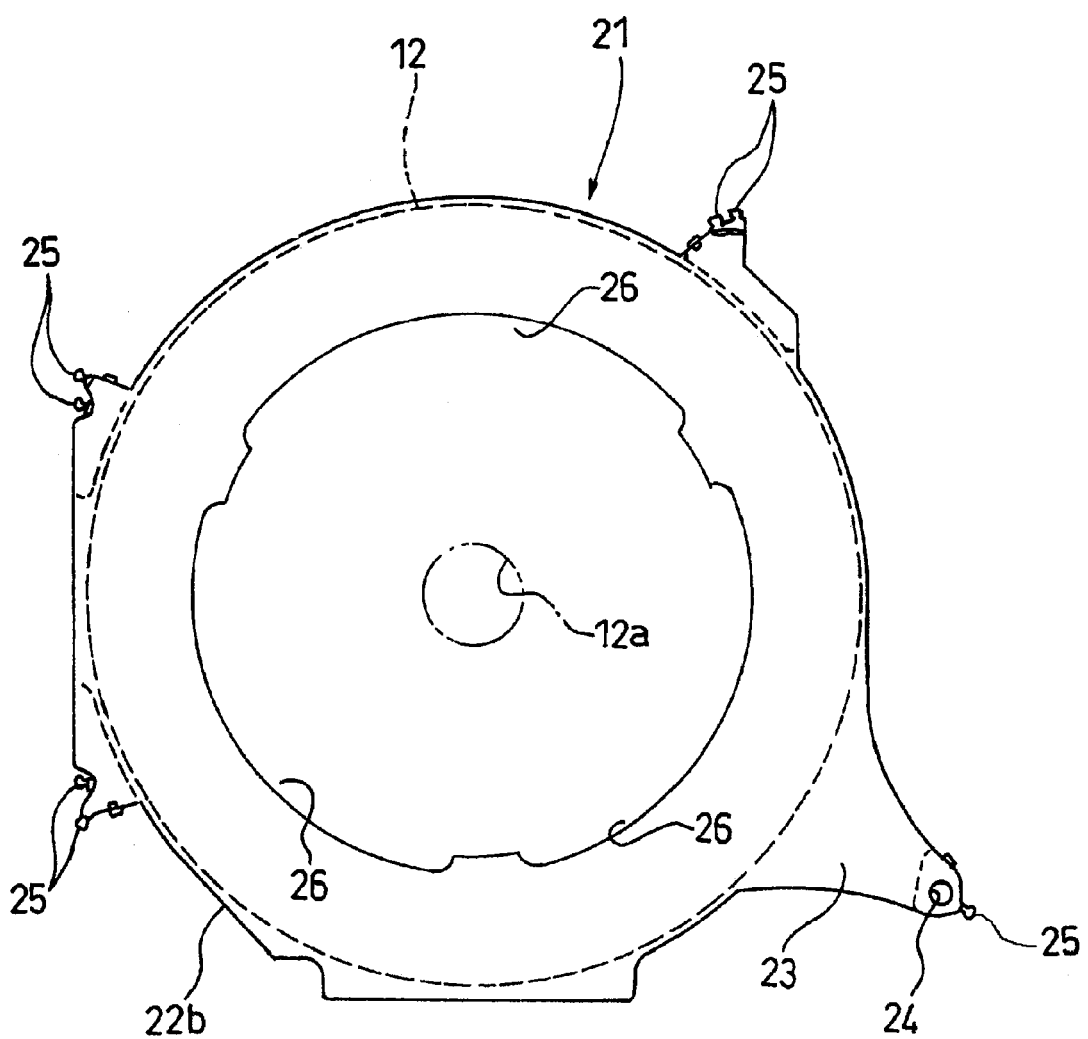
FIG. 14 A plan view showing another example of the tray.
Figure 15:
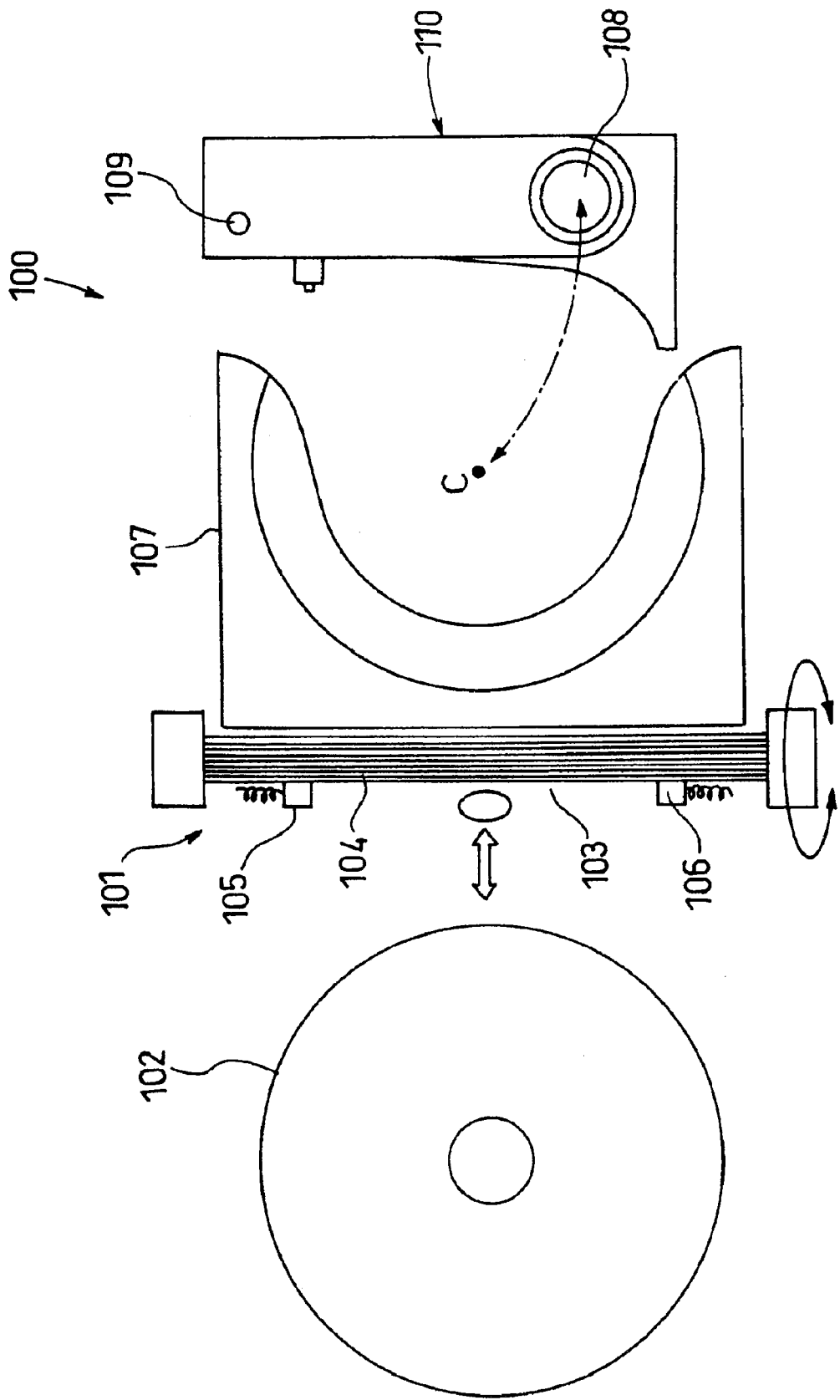
FIG. 15 A plan view of an optical disk device in the prior art.

In addition, in the optical disk device 10 according to the above embodiment, the circle with a large diameter to contain all disk retaining detents 14b therein is cut out as the hollow portion 22a. Further, as shown in FIG. 14, notches 26 corresponding to the disk retaining detents 14b may be provided.

Also, the case where the optical disk device 10 is built in the car audio equipment 1 equipped with the radio 2, the cassette tape player 3, etc. is explained. In addition, the case where the optical disk device 10 is used solely can also be applied.

This application is based upon Japanese Patent Applications (Patent Application No. 2004-242031 and Patent Application No. 2004-242032) filed on Aug. 23, 2004; the entire contents of which are incorporated herein by reference.

INDUSTRIAL APPLICABILITY

As described above, the optical disk device according to the present invention possesses such an advantage that, since the outer circumferential portion of each tray of a plurality of trays comes into contact with the optical disk substantially over the whole circumference to hold such disk, a pushing force can be applied uniformly in the circumferential direction of the optical disk and a thickness of the optical disk device can be reduced not to be affected by the warp of the loaded optical disk, and also is useful as the multiple-disk changer type optical disk device that has a plurality of trays to load a plurality of optical disks thereon.

Also, the optical disk device according to the present invention possesses such an advantage that, since the hollow portions of the tray corresponding to the holding holes of the optical disk are formed such that projection portions projected in excess of a standard thickness dimension of the optical disk do not interfere with the tray, a reduction in thickness of the optical disk device can be attained can be provided even when the small-diameter optical disk fitted into the adapter is loaded, for example, and also is useful as the optical disk device concerning the multiple-disk changer type optical disk device that has a plurality of trays to load a plurality of optical disks thereon.

The invention claimed is:

1. An optical disk device, comprising:
   a main body that is adapted to load a plurality of optical disks therein; and
   a plurality of trays that holds each of the optical disks individually in an inside of the main body,
   wherein an outer peripheral portion of each of the trays comes into contact with an outer peripheral portion of each optical disk held in each tray over a substantially whole circumference, and
   wherein each of the trays has an energizing unit which energizes the tray to push the optical disk in a thickness direction.

2. The optical disk device according to claim 1, wherein each of the trays has a hollow portion formed substantially concentrically with each of the optical disks held in the tray.

3. The optical disk device according to claim 1 wherein the energizing unit has an energizing force for absorbing a vibration applied from an outside.

4. The optical disk device according to claim 1, wherein the energizing unit has an energizing force which is greater than a sum of an energizing force for bringing a contact face of the loaded optical disk into contact with the tray and an energizing force for absorbing a vibration applied from an outside.

5. The optical disk device according to claim 1, wherein a plurality of the energizing unit are provided in plural locations to the tray.

6. The optical disk device according to claim 1, wherein the energizing unit is formed of a spring member whose one end is fixed to the tray and whose other end is fixed to the main body.

7. An optical disk device, comprising:
   a main body that is adapted to load a plurality of optical disks therein; and
   a plurality of trays that hold each of the optical disks individually in an inside of the main body,
   wherein each of the trays has a circular hollow portion formed substantially concentrically with each of the optical disks held in the tray,
   wherein the hollow portion is formed so that a projection portion formed in excess of a standard thickness dimension of the optical disk does not contact the tray, and
   wherein each of the trays has an energizing unit which energizes the tray to push the optical disk in a thickness direction.

8. The optical disk device according to claim 7, wherein the energizing unit has an energizing force for bringing a contact face of the loaded optical disk into contact with the tray.

9. The optical disk device according to claim 7, wherein the energizing unit has an energizing force for absorbing a vibration applied from an outside.

10. The optical disk device according to claim 7, wherein the energizing unit has an energizing force which is greater than a sum of an energizing force for bringing a contact face of the loaded optical disk into contact with the tray and an energizing force for absorbing a vibration applied from an outside.

11. The optical disk device according to claim 7, wherein the energizing unit is formed of a spring member whose one end is fixed to the tray and whose other end is fixed to the main body.

* * * * *